UNITED STATES PATENT OFFICE.

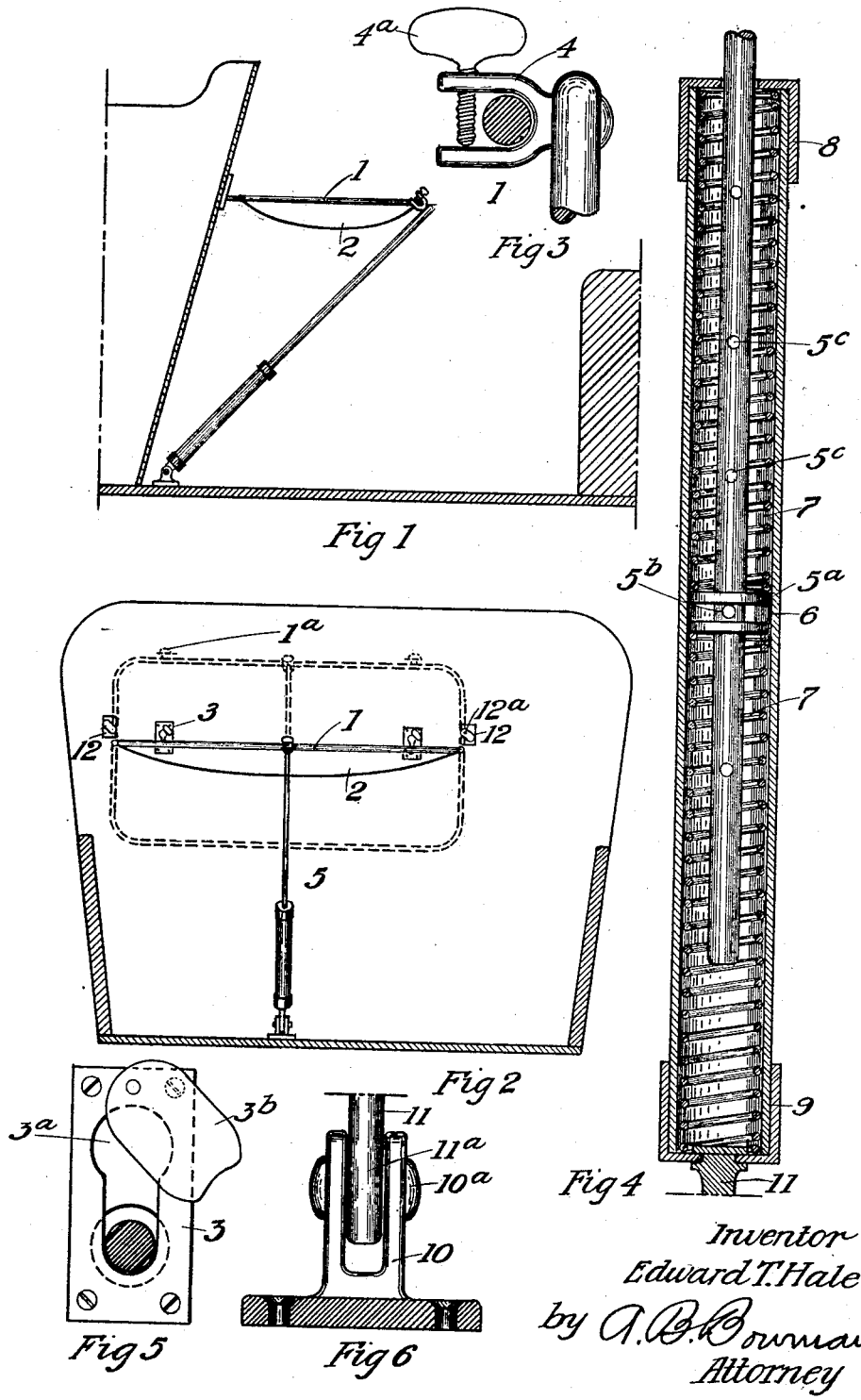

EDWARD T. HALE, OF SAN DIEGO, CALIFORNIA.

BABY-HOLDING ATTACHMENT FOR VEHICLES.

1,215,652.  Specification of Letters Patent.  Patented Feb. 13, 1917.

Application filed October 30, 1915. Serial No. 58,794.

*To all whom it may concern:*

Be it known that I, EDWARD T. HALE, a citizen of the United States, residing at San Diego, in the county of San Diego and State of California, have invented a certain new and useful Baby-Holding Attachment for Vehicles, of which the following is a specification.

My invention relates to an attachment for vehicles, preferably automobiles, in the form of a hammock or bed for holding a baby, and the objects of my invention are: first, to provide a device of this class with cushion means for supporting the body portion of the device which provides a cushion for both the upward and downward movement; second, to provide a device of this class which may be readily folded up into a compact form against the back of the front seat and out of the way when not in use; third, to provide a device of this class which takes up but little space in either position and fourth, to provide a device of this class which is simple and economical of construction, durable, easily installed and will not readily get out of order.

With these and other objects in view as will appear hereinafter my invention consists of certain novel features of construction, combination, and arrangement of parts as will be hereinafter described in detail and particularly set forth in the appended claims, reference being had to the accompanying drawings and to the characters of reference thereon which form a part of the specification in which:

Figure 1 is a fragmentary longitudinal sectional view of a vehicle body showing my device mounted thereon in section. Fig. 2 is a transverse sectional view of a vehicle body showing a rear view of my device shown in position and showing by dotted lines its position when folded up against the back of the front seat. Fig. 3 is a detailed view of the support connection to the outer side of the bed. Fig. 4 is a longitudinal detailed sectional view of the cushioning mechanism. Fig. 5 is a front view of one of the plates for supporting the inner edge of the bed when in position for use, and Fig. 6 is a detailed view of the floor lug for supporting the cushioning means.

Similar characters of reference refer to similar parts throughout the several views.

The bed frame 1, flexible part 2, plates 3, support connection 4, supporting rod 5, pipe 6, springs 7, cap 8, cap 9, floor lug 10, cap and lug connection 11, and clips 12 constitute the principal parts of my baby holding attachment. The bed frame 1 is rectangularly shaped with rounded corners as shown best by dotted lines in Fig. 2 and secured to this frame is a flexible part 2 which is preferably canvas so arranged thereon that it bags in the center as shown in Figs. 1 and 2 of the drawing. This bed frame 1 is provided on one side with a pair of lugs 1ª which are provided with enlarged round head portions adapted to be inserted into the large portion 3ª of the hole in the plate 3 and when dropped down into the position shown in Fig. 5 of the drawing, the enlarged portion will hold said lug in said slot. This plate is also provided with a plate 3ᵇ pivotally secured thereon adapted to drop down over the large portion 3ª for preventing the lugs 1ª from rising in said plate but may be readily moved to a position so that the lugs 1ª may be removed from said plate. Mounted on the opposite side of the bed frame 1 from the lugs 1ª is the connecting piece 4 which is a U shaped piece provided with a threaded hole in one side adapted for the wing screw 4ª. To this connecting piece is rigidly secured the support rod 5 which extends downwardly and on its lower end is mounted the pipe 6 which is provided on its upper end with a cap 8 provided with a central hole adapted to allow the reciprocation of the rod 5 thereon. Mounted on the lower end of this pipe 6 is another cap 9 which is provided with a central hole adapted for the connecting piece 11 and this connecting piece 11 is provided with a hole 11ª therein adapted for the rivet 10ª for pivotally mounting said connecting piece 11 on the floor piece 10 which floor piece 10 is rigidly secured to the floor. Near the front seat back adjustably mounted on the rod 5 are the annular pieces 5ª by means of the pin 5ᵇ mounted in the holes 5ᶜ in said rod. Mounted in each end of the pipe 6 and separated by the annular pieces 5ª are the springs 7 one in each end which are placed therein under compression and are adapted for a cushion for the outer edge of the bed frame and take the upward and downward thrust. Mounted on the back surface of the rear seat of the vehicle are the clips 12 to which are pivoted lugs 12ª adapted to fit over the end frame 1 and hold the same flat against the back surface of the front seat, the top side being supported by means of the rod 5 when the bed frame is folded up against said seat as shown by dotted lines in Fig. 2 of the drawing.

Though I have shown and described a particular construction, combination and arrangement of parts, I do not wish to be limited to this particular construction, combination and arrangement but desire to include in the purview of my invention the construction, combination, and arrangement substantially as set forth in the appended claims.

It is obvious that with this construction there is provided a device for holding a baby while riding in a vehicle which will absorb the shocks to a minimum between the vehicle and the baby, that the device is applicable to different makes of vehicles, that the device may readily be folded into a compact form when not in use, that the device occupies a minimum of space when in use, that the device is simple, economical of construction, durable, easily installed and will not readily get out of order.

Having thus described my invention what I claim as new and desire to secure by Letters Patent is:

1. In a device of the class described, the combination of a bed frame mounted on the rear side of the front seat of a vehicle so as to be readily attached to and removed therefrom, a rod pivoted centrally to the other side of said bed frame so as to be readily attached and detached therefrom and cushion means in connection with the lower end of said rod connected to the floor of the vehicle, whereby said rod is cushioned thereon and provided with radial movement.

2. In a device of the class described the combination of a bed frame detachably secured to the rear side of the front seat of a vehicle, a rod detachably pivoted centrally to the other side of said bed frame, cushion means in connection with the lower end of said rod secured to the floor of the vehicle, and means for supporting said bed frame flat-wise against the rear surface of the front seat of the vehicle, whereby said device may be folded against said seat and held in said folded position.

3. In a device of the class described, the combination of a rectangularly shaped frame mounted on the back of the front seat of a vehicle, a canvas secured thereto so that it sags in the center, a rod pivotally connected to said frame at the opposite side from its attachment to said seat and a cushion means comprising double acting springs pivotally connected to the vehicle floor, whereby said rod is cushioned relatively to said floor for both upward and downward movement and is also permitted to move radially on said pivot.

In testimony whereof, I have hereunto set my hand at San Diego, California, this 25 day of October 1915.

EDWARD T. HALE.